United States Patent [19]
Fujita

[11] Patent Number: 5,355,173
[45] Date of Patent: Oct. 11, 1994

[54] IMAGE PROCESSING SYSTEM WITH EXTERNAL STORAGE OF SPECIAL EFFECT DATA

[75] Inventor: Shinichi Fujita, Kanagawa, Japan

[73] Assignee: Sony Corporation, Tokyo, Japan

[21] Appl. No.: 933,808

[22] Filed: Aug. 24, 1992

[30] Foreign Application Priority Data

Aug. 27, 1991 [JP] Japan .................. 3-215130

[51] Int. Cl.⁵ .............................. H04N 9/74
[52] U.S. Cl. .................... 348/590; 348/593
[58] Field of Search ............ 358/185, 183, 22, 335; H04N 9/74, 5/262, 5/272

[56] References Cited

U.S. PATENT DOCUMENTS

| | | | |
|---|---|---|---|
| 4,334,245 | 6/1982 | Michael | 358/183 |
| 4,694,357 | 9/1987 | Rahman et al. | 360/9.1 |
| 4,991,019 | 2/1991 | Enami et al. | |
| 4,992,781 | 2/1991 | Iwasaki et al. | 358/22 |
| 5,168,363 | 12/1992 | Kojima et al. | 358/183 |

FOREIGN PATENT DOCUMENTS

| | | | |
|---|---|---|---|
| 0498647 | 8/1992 | European Pat. Off. | H04N 5/272 |
| 2022355 | 12/1979 | United Kingdom . | |
| 9108638 | of 1991 | World Int. Prop. O. | H04N 5/14 |

*Primary Examiner*—Victor R. Kostak
*Assistant Examiner*—Nathan J. Flynn
*Attorney, Agent, or Firm*—William S. Frommer; Alvin Sinderbrand

[57] ABSTRACT

An image processing system for applying a video special effect to input image data. The system comprises a memory for storing image processing data; a coefficient generator for generating coefficients on the basis of the image processing data stored in the memory; a signal processor for processing the input image data on the basis of the coefficients outputted from the coefficient generator; an external storage unit for storing plural kinds of image processing data; and a controller for controlling the memory, and the external storage unit in such a manner as to transfer a desired one of the plural kinds of image processing data to the memory.

5 Claims, 1 Drawing Sheet

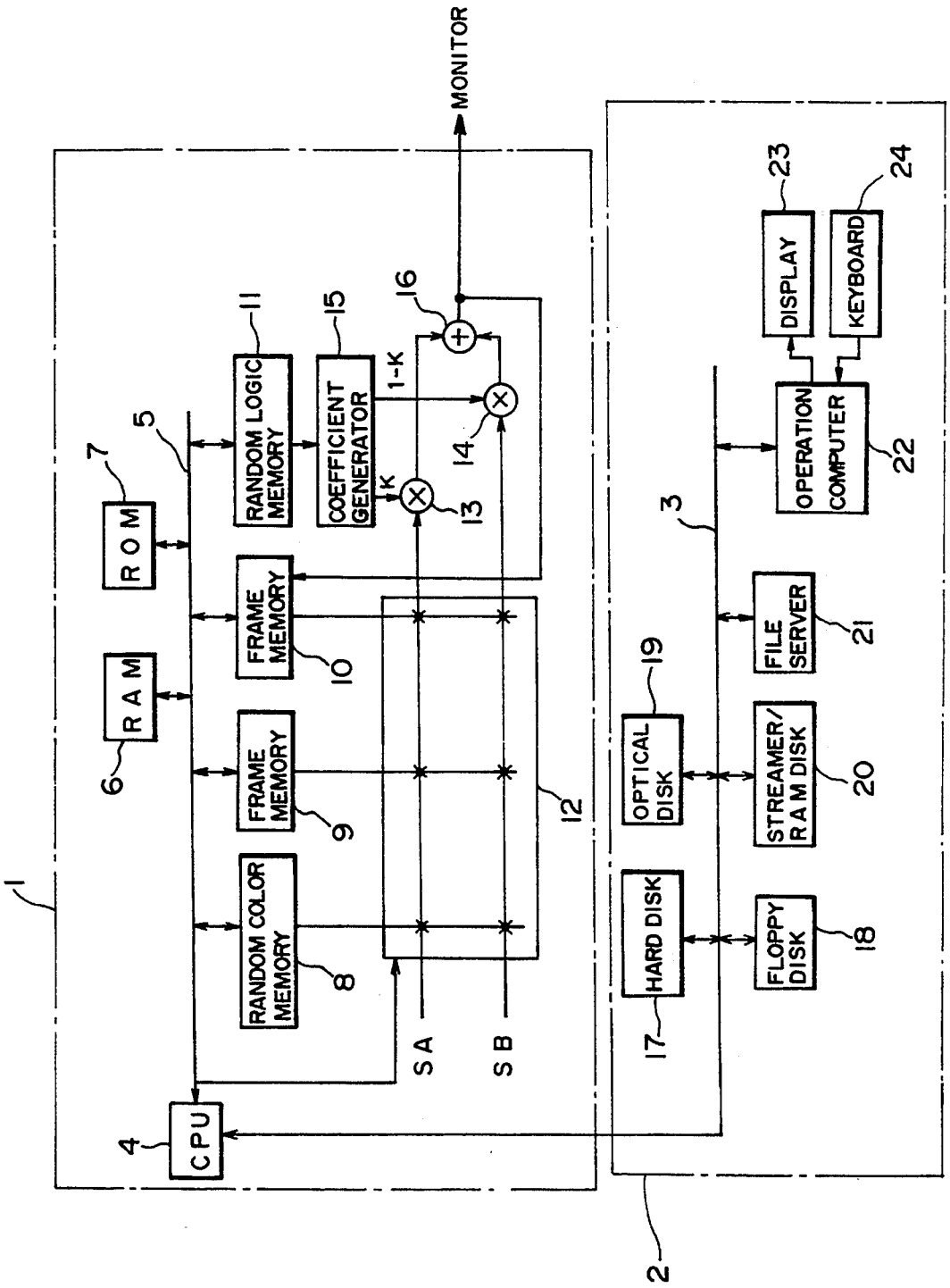

IMAGE PROCESSING SYSTEM WITH EXTERNAL STORAGE OF SPECIAL EFFECT DATA

BACKGROUND OF THE INVENTION

1. Field of the Invention

The present invention relates to an image processing system which is capable of processing image data in a video special effect mode such as a wipe or fade mode.

2. Description of the Prior Art

There have been known heretofore a variety of video special effect apparatus adapted to process image data in a wipe or other video special effect mode, as disclosed in U.S. Pat. No. 4,199,788 for example. However, in such conventional apparatus there are certain limits to the kinds of video special effects that may be performed therein.

OBJECT AND SUMMARY OF THE INVENTION

In view of such circumstances mentioned, it is It is accordingly, image processing system which is capable of performing a greater variety of video special effects and with more flexibility than prior art special effect apparatus.

For the purpose of achieving the above object, the image processing system of the present invention for applying video special effects to input image data comprises a memory for storing image processing data, coefficient generator means for generating coefficients in accordance with the image processing data stored in the memory, signal processor means for processing the input image data in accordance with the coefficients outputted from the coefficient generator means, external storage means for storing plural kinds of image processing data, and control means for controlling the memory, the coefficient generator means and the signal processor means. In this arrangement, the control means serves to transfer at least a desired one of the plural kinds of image processing data to the memory.

BRIEF DESCRIPTION OF THE DRAWING

FIG. 1 is a block diagram of an exemplary embodiment of an image processing system according to the present invention.

DESCRIPTION OF THE PREFERRED EMBODIMENT

Hereinafter an exemplary embodiment of the present invention will be described in detail with reference to FIG. 1, which is a block diagram of an image processing system.

As show in FIG. 1, a special effect processor 1 and an external storage unit 2 are connected to each other via a system bus 3. A CPU 4 incorporated in the special effect processor 1 controls transfer of data to and from the external storage unit 2 and also control the special effect processing executed in the processor 1.

A system bus 5 is connected to the CPU 4, and there are also connected to the bus 5 a RAM 6, a ROM 7, a random color memory 8 for storing a plurality of color data, frame memories 9, 10 for storing image data and a random logic memory 11 for storing character data, shape data, and regular pattern data indicative of wipe shapes and so forth.

In the RAM 6 are stored execution procedure lists indicative of the special effects processing to be executed and the timing thereof, and library control data indicative of the storage of location data stored in an external storage unit which is described below.

The image data (including the color data) outputted from the memories 8–10 and image data SA, SB outputted from a video camera, a VTR or the like are supplied to a switch circuit 12. Under control of the CPU 4, the switch circuit 12 is sperated in accordance with the execution procedure list stored in the RAM 6. The image data selected by the switch circuit 12 are supplied to multipliers 13 and 14.

The character data and so forth outputted from the memory 11 are supplied to a coefficient generator 15. Coefficients K, 1-K (where $0 \leq K \leq 1$) are outputted from the coefficient generator 15 in synchronism with the character data and so forth. The coefficients K, 1-K thus obtained from the coefficient generator 15 are supplied to the multipliers 13, 14, where the image data outputted from the switch circuit 12 are multiplied by the coefficients.

The resulting image data outputted from the multipliers 13, 14 are supplied to an adder 16, and the resulting signal is outputted as special-effect processed image data.

The image data obtained from the adder 16 is supplied as write data to the frame memory 10 and also is supplied to a monitor (not shown) so that the special-effect processed image can be viewed.

The system bus 3 is connected to the CPU 4, and also is connected to an external storage unit 2 which includes a hard disk 17, a floppy disk 18, an optical disk 19, a streamer/RAM disk 20 and a file server 21. An operation computer 22 is also connected to the system bus 3. A display device 23 and a keyboard 24 are connected to the computer 22.

In the hard disk 17 and so forth, there are stored character, shape and regular pattern data, execution procedure lists and so on. The execution procedure lists can be prepared in the computer 22 as well by manipulation of, e.g., the keyboard 24.

In executing the special effect processing, one of the procedure lists written on the hard disk 17 or the like is selected by manipulation of the keyboard 24 and then is written in the RAM 6 via the system bus 3 and the CPU 4 as described above. Thereafter the required image data, character data and so forth are read out from the hard disk 17 or the like by the CPU 4 in accordance with the selected execution procedure list and are written in the frame memories 9, 10 and the random logic memory 11. Special effect processing is then automatically executed in the special effect processor 1 on the basis of the data transferred from the external storage unit 2 to the memories 9, 10 and 11.

For example, when a wipe process is to be performed on image data SA and image data SO stored in the hard disk 17 and so forth, first the image data SO is read out from the hard disk 17 or the like via the CPU 4 and is written in, e.g., the frame memory 10. In the switch circuit 12, the image data SA and the image data SO outputted from the frame memory 10 are selected. Then the pattern data for the wipe process are sequentially read out from the random logic memory 11, and coefficients K, 1-K are generated from the coefficient generator 15, so that image data obtained by wiping the image data SO and SA is outputted from the adder 16. If the pattern data required for the wipe process was not previously stored in the memory 11, then it is necessary to transfer the pattern data from the hard disk 17 via the CPU 4 to the memory 11 in a similar manner to the above-described transfer of the image data SO. The special effect processing is executed under control of the CPU 4.

As another example, there will now be described insertion of a red character in the image data S1 stored in the hard disk 17 or the like. In this case, the image data S1 is first read out from the hard disk 17 or the like via the CPU 4 and then is written in, e.g., the frame memory 10. Meanwhile, red color data is outputted from the random color memory 8. The red color data from memory 8 and the image data S1 outputted from the frame memory 10 are selected by the switch circuit 12 and then are supplied respectively to the multipliers 13 and 14. Further data representing the character to be inserted are sequentially read out from the random logic memory 11, and coefficients K, 1-K (with K=1 in the portion corresponding to the character, and K=0 otherwise) are generated from the coefficient generator 15, so that image data resulting from insertion of the red character in the image data S1 is outputted from the adder 16. If the character data to be inserted is not previously stored in the memory 11, then it is necessary to read out the character data from the hard disk 17 via the CPU 4 in similar manner to the image data S1 and then to write the data in the memory 11.

As another example, there will now be described a process for fading in or out image data S2 written in the hard disk 17 or the like. First the image data S2 is read out from the hard disk 17 or the like via the CPU 4 and then is written in, e.g., the frame memory 11. The image data S2 outputted from the frame memory 10 is selected by the switch circuit 12 and is supplied to the multiplier 13. Meanwhile fade-in or fade-out pattern data are sequentially read out from the random logic memory 11, and a coefficient K is generated from the coefficient generator 15, whereby image data obtained by fading in or out the image data S2 is outputted from the adder 16. In case the fade-in or fade-out regular pattern data is not previously stored in the memory 11, it is necessary to read out the fade-in or fade-out regular pattern data from the hard disk 17 or the like via the CPU 4 as was done with image data S2 and then to write the data in the memory 11.

It is possible in this embodiment to save the special-effect processed image data outputted from the adder 16. In order to do so, the image data obtained from the adder 16 is written in the frame memory 10 in response to a command input via the keyboard 24 and the data then is transferred for storage in the hard disk 17 or the like via the CPU 4. The saved image data can thereafter be read out and used whenever required.

In the embodiment described, a desired special effect process can be executed by using the image data read out from the external storage such as the hard disk 17, and special effect processing can be performed with greater flexibility because of the more numerous kinds of data that can be used.

Furthermore, a desired special effect process can be executed in accordance with the execution procedure list by storing only currently required data in the frame memories 9, 10 or the random logic memory 11, so that the storage capacities of the memories 9, 10 and 11 can be minimized and the production cost reduced.

In addition, the timing for reading out the image data and so forth from external storage can be preset in the execution procedure list so that many procedures are executed in a synchronized operation.

Moreover, the special-effect processed image data can be retained in an external storage device such as the hard disk 17 and can be reproduced in real time whenever necessary.

According to the present invention, data can be transferred between external storage and the signal processor, and the image data and so forth read out from external storage supplied to the signal processor so as to be processed in a special effect mode. In addition, there are more kinds of data available for use in the signal processor so that there is more flexibility in performing special effects. Furthermore, it is possible to execute any desired special effect process by storing the data as needed in the memories of the signal processor, thereby minimizing the storage capacities of the memories and reducing production cost. Besides the above, the special-effect processed image data obtained from the signal processor can be supplied to and retained in the external storage, so that any desired effect can be reproduced whenever necessary.

What is claimed is:

1. An image processing system for applying a video special effect to input image data, comprising:
    a memory for storing image processing data;
    coefficient generator means for generating coefficients on the basis of the image processing data stored in said memory;
    signal processor means for processing the input image data on the basis of the coefficients generated by said coefficient generator means;
    switch means for selectively supplying the input image data to the signal processor means from at least one of a plurality of sources of image data;
    control means for controlling operation of said switch means; said control means also being connected for data communication with said memory; and
    external storage means for storing plural kinds of image processing data;
    said control means being connected for data communication with said external storage means and controlling said external storage means and said memory so as to transfer at least a desired one of said plural kinds of image processing data to said memory from said external storage means.

2. The image processing system according to claim 1, wherein said external storage means includes a hard disk for storing said plural kinds of image processing data.

3. The image processing system according to claim 1, wherein said external storage means includes a hard disk for storing said plural kinds of image processing data, and an operation computer for forming said plural kinds of image processing data.

4. The image processing system according to claim 1, wherein said memory includes a first memory unit for storing color data, a second memory unit for storing data representing an image, and a third memory unit for storing pattern data; said plurality of sources of image data include a video camera, a VTR, said first memory unit, and said second memory unit; and said signal processor means includes multiplier means for multiplying by said coefficients the input image data supplied by said switch means.

5. The image processing system according to claim 4, wherein said switch means selectively supplies input image data to the signal processor means from two of said plurality of sources of image data, thereby providing first and second input signals to the signal processor means; and said multiplier means includes first and second multipliers for respectively multiplying said first and second input signals by a respective one of said coefficients.

* * * * *